US008301996B2

(12) United States Patent
Ofek et al.

(10) Patent No.: US 8,301,996 B2
(45) Date of Patent: Oct. 30, 2012

(54) ANNOTATING IMAGES WITH INSTRUCTIONS

(75) Inventors: Eyal Ofek, Redmond, WA (US); Billy Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 12/406,979

(22) Filed: Mar. 19, 2009

(65) Prior Publication Data
US 2010/0241946 A1    Sep. 23, 2010

(51) Int. Cl.
    G06F 17/00    (2006.01)
(52) U.S. Cl. .................. 715/231; 715/232; 382/181
(58) Field of Classification Search .............. None
    See application file for complete search history.

(56) References Cited

U.S. PATENT DOCUMENTS

| | | | |
|---|---|---|---|
| 6,070,124 A | 5/2000 | Nimura et al. | |
| 6,351,707 B1 | 2/2002 | Ichikawa | |
| 6,725,156 B2 | 4/2004 | Kaplan | |
| 7,765,231 B2 * | 7/2010 | Rathus et al. ............ | 707/783 |
| 2003/0147099 A1 * | 8/2003 | Heimendinger et al. ..... | 358/462 |
| 2003/0164819 A1 * | 9/2003 | Waibel ................ | 345/173 |
| 2004/0208372 A1 * | 10/2004 | Boncyk et al. ............ | 382/181 |
| 2006/0089792 A1 * | 4/2006 | Manber et al. ............ | 701/207 |
| 2006/0240862 A1 * | 10/2006 | Neven et al. ............ | 455/550.1 |
| 2007/0110338 A1 * | 5/2007 | Snavely et al. ............ | 382/305 |
| 2008/0021928 A1 * | 1/2008 | Yagnik ................ | 707/104.1 |
| 2009/0237546 A1 * | 9/2009 | Bloebaum et al. ......... | 348/333.01 |
| 2010/0080470 A1 * | 4/2010 | Deluca et al. ............ | 382/209 |
| 2010/0172550 A1 * | 7/2010 | Gilley et al. ............ | 382/118 |

FOREIGN PATENT DOCUMENTS

WO    02063243 A1    8/2002

OTHER PUBLICATIONS

Datta, Ritendra et al.; Image Retrieval: Ideas, Influences, and Trends of the New Age; Apr. 2008; ACM Computing Surveys; vol. 40, No. 2, Article 5; pp. 1-60.*

"Annotate"; Merriam-Webster Online Dictionary; retrieved Feb. 24, 2011 32011; from http://www.merriam-webster.com/dictionary/annotate; p. 1.*

Fickas, et al., "Route-Finding Assistances for Community Travelers with Cognitive Impairments: A Comparison of Four Prompt Modes", retrieved at <<http://insitu2007.freeband.nl/docs/papers/Fickas_InSitu2007.pdf>>, pp. 4.

Goodman, et al., "Using Landmarks to Support Older People in Navigation", retrieved at <<http://www.dcs.gla.ac.uk/~stephen/papers/MobileHCI2004_goodman.pdf>>, pp. 11.

Chittaro, et al., "Augmenting Audio Messages with Visual Directions in Mobile Guides: An Evaluation of Three Approaches", retrieved at <<http://hcilab.uniud.it/publications/2005-05/VisualDirections_MOBILEHCI05.pdf>>, Sep. 19-22, 2005, Salzburg, Austria, pp. 8.

(Continued)

*Primary Examiner* — Stephen Hong
*Assistant Examiner* — Asher Kells

(57) ABSTRACT

A method described herein includes the acts of receiving an image captured by a mobile computing device and automatically annotating the image to create an annotated image, wherein annotations on the annotated image provide instructions to a user of the mobile computing device. The method further includes transmitting the annotated image to the mobile computing device.

20 Claims, 9 Drawing Sheets

OTHER PUBLICATIONS

Aitamurto, Tanja, "Nokia Develops Navigating System Based on Image Recognition, Landmarks", retrieved at <<http://venturebeat.com/2008/04/11/nokia-develops-navigating-system-based-on-image-recognition-landmarks/>>, Apr. 11, 2008, pp. 5.

"TripPilot: Route Planner with Driving Direction on Interactive Maps", retrieved at <<http://www.gpspilot.com/products/trippilot.shtml>>, Jan. 15, 2009, pp. 3.

Kruger, et al., "The Connected User Interface: Realizing a Personal Situated Navigation Service", retrieved at <<http://www.medien.ifi.lmu.de/pubdb/publications/pub/butz2004userinterface/butz2004userinterface.pdf>>, Jan. 13-16, 2004, Madeira, Funchal, Portugal, pp. 8.

"Guides on how to do things", retrieved at <<http://www.howtoall.com/>>, Jan. 19, 2009, p. 1.

"SoYouWanna.Com", retrieved at <<http://www.soyouwanna.com/site/categories/technology.html>>, Jan. 19, 2009, pp. 2.

"How to Electrical Repairs", retrieved at <<http://www.acmehowto.com/howto/homemaintenance/electrical/electrical.php>>, Jan. 19, 2009, pp. 2.

"Photosynth", retrieved at <<http://photosynth.net/Default.aspx>>, Jan. 19, 2009, p. 1.

Snavely, et al., "Photo Tourism: Exploring Photo Collections in 3D", ACM Transactions on Graphics (SIGGRAPH Proceedings), 25(3), 2006, 835-846.

Raskar, et al., "RFIG Lamps: Interacting with a Self-Describing World via Photosensing Wireless Tags and Projectors", retrieved at <<http://www.merl.com/papers/docs/TR2006-108.pdf>>, Jul. 2006, pp. 12.

"VideoJug", retrieved at <<http://www.videojug.com/>>, Jan. 19, 2009, pp. 2.

"eHow", retrieved at <<http://www.ehow.com/>>, Jan. 19, 2009, pp. 2.

* cited by examiner

ANNOTATING IMAGES WITH INSTRUCTIONS

BACKGROUND

Conventionally, instructions, such as travel instructions or instructions for fixing an appliance, have been provided to individuals in the form of text and/or images. For example, instructions for fixing a portion of a dishwasher may include textual instructions for removing a casing and an image that corresponds to such textual instructions. In some instances, however, the textual instructions may be unclear. Furthermore, generic images that are provided with the textual instructions may not correspond with a dishwasher of the user (e.g., the image may not map precisely to the object of interest to the user). Therefore despite detailed instructions, the user may be confused as to how to execute such instructions.

In another example, travel directions are often presented to a user in textual form. For instance, the user may provide a mapping application with a beginning point and a destination point, and the mapping application may output detailed instructions (e.g., turn by turn instructions) from the beginning point to the destination point. Sometimes, however, such detailed instructions may be insufficient in connection with directing the user to the end destination. For example, if the requested destination is on a third floor of a building, most mapping applications will not provide information to the user indicating that the destination is not on the ground floor. Additionally, in this example, GPS data will not aid the user in locating the end destination.

Currently, some computer-implemented applications for providing instructions have been generated to alleviate some of the aforementioned concerns. For instance, an exemplary application available by way of the Internet provides video instructions to a user in connection with performing a variety of tasks. Thus, the user can watch the video and mimic actions seen in the video in connection with performing a task. Again, however, objects in the video may not directly correspond to objects pertaining to the task to be undertaken by the user. Furthermore, a video may be inconvenient, as content of the video may move more slowly or more quickly than the user desires. For instance, the user may wish to actively follow the video, but may have to frequently pause and/or rewind the video, causing viewing of the video to be tedious to the user.

SUMMARY

The following is a brief summary of subject matter that is described in greater detail herein. This summary is not intended to be limiting as to the scope of the claims.

Various technologies pertaining to annotating images are described in detail herein. Pursuant to an example, a portable computing device such as a portable telephone or personal digital assistant may be configured with an application pertaining to providing instructions to users. In another example, the portable computing device can be configured with a browser that allows the portable computing device to access the application by way of the browser. The instructions that can be provided by way of the application can include instructions for operating a machine, assembling an object, fixing an object (e.g., fixing an appliance), instructions pertaining to travel or any other suitable instructions. For instance, the application can be initiated at the mobile computing device and a user can select a type of instructions that are desired.

Upon selecting the desired type of instructions, the user can employ the mobile computing device to capture an image pertaining to the desirably received instructions. For example, if the user selects instructions for fixing a particular part of a dishwasher, the user may employ the mobile computing device to capture an image of the part of the dishwasher. In another example, if the user wishes to receive instructions for changing oil in an automobile, the user may employ the mobile computing device to capture an image, for instance, of the engine of the automobile. In another example, the user may employ the mobile computing device to capture an image, for instance, of the hardware components of a personal computer or laptop or any other digital device. In still yet another example, the user may specify which object is captured (e.g., type of machine & model). Still further, an image recognition application may be used in connection with automatically recognizing an object captured in an image, wherein the image recognition application may reside on the mobile computing device or a server. The image recognition application may use a variety of tools, including but not limited to recognition of a bar code of an object in an image, recognition of text, etc.

The captured image may then be transmitted to a server, wherein the server includes a plurality of images that pertain to the object in the received image. For instance, if the image received from the mobile computing device is an image of a part of a dishwasher, the plurality of images retained on the server can be images of a substantially similar part in a substantially similar dishwasher. At least one of the images retained on the server may have annotations that correspond to instructions requested by the user of the mobile computing device. For instance, such annotations may be instructions in the form of images (e.g., arrows, circles, text instructions, etc.). In another example, the annotations may be video annotations, audio annotations, animations, etc. The image captured by the mobile computing device can be compared with at least one of the plurality of images retained on the server and a position of the object in the image received from the mobile computing device can be ascertained relative to a position of a corresponding object in at least one of the images on the server. Such relative position may then be used to position annotations on the image captured by the mobile computing device.

Thus, the image captured by way of the mobile computing device can be annotated with one or more annotations thereby creating an annotated image. The annotated image may then be transmitted from the server back to the mobile computing device for display to the user. In another example, the mobile computing device may include functionality for locally annotating the image. Thus, the user can be provided with instructions that overlay an actual image of the object for which instructions were requested. After completing a step pertaining to the annotation, the user may capture a subsequent image and transmit such image to the server. This process can be repeated until the user has completed the task.

Other aspects will be appreciated upon reading and understanding the attached figures and description.

DETAILED DESCRIPTION

Figure 1:
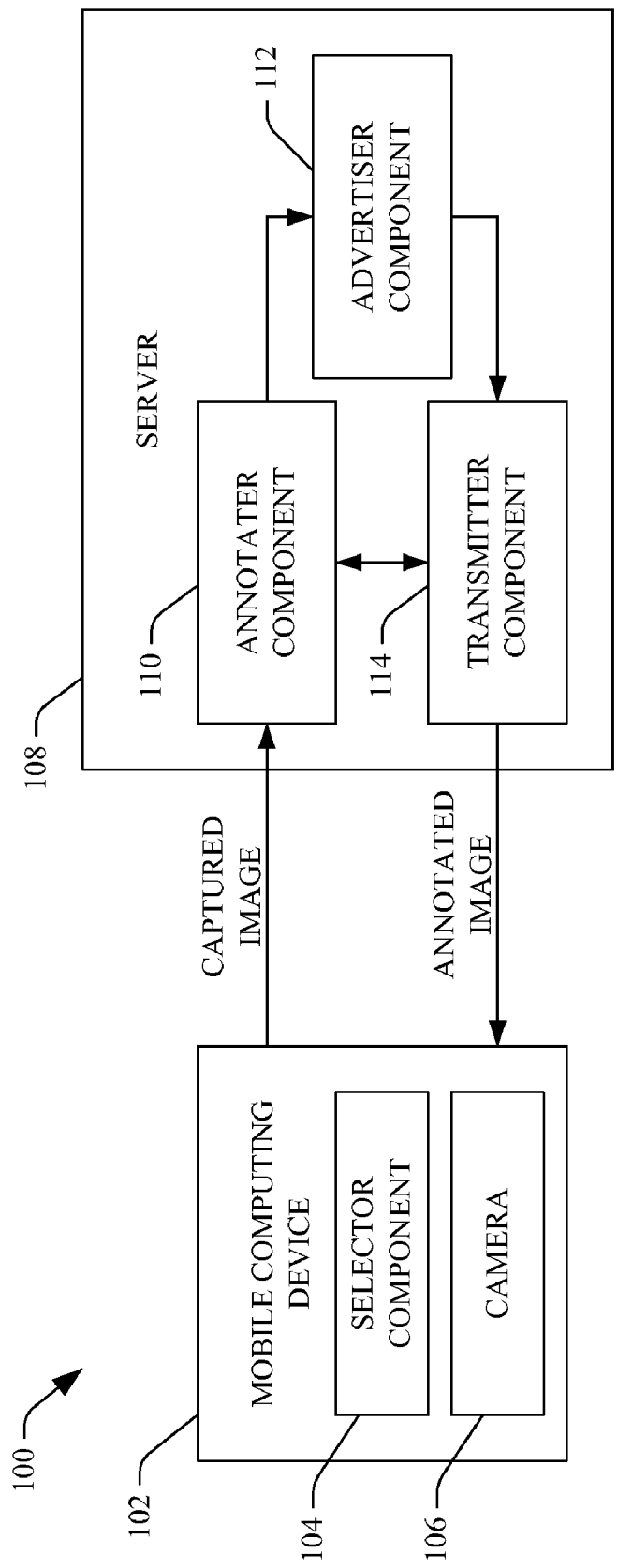
FIG. 1 is a functional block diagram of an exemplary system that facilitates automatically annotating an image provided by a mobile computing device.

Various technologies pertaining to annotating images will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Furthermore, as used herein, the term "exemplary" refers to serving as an illustration or example.

With reference to FIG. 1, an exemplary system 100 that facilitates automatically annotating one or more images is illustrated. The system 100 includes a mobile computing device 102, which may be a personal digital assistant, a portable telephone or other suitable portable computing device. The mobile computing device 102 can include functionality that allows such mobile computing device 102 to communicate with another device by way of a network. Thus, for instance, the mobile computing device 102 may be associated with Wi-Fi technology, WiMax technology, cellular technology, etc. The mobile computing device 102 may further include an operating system that can support execution of one or more applications on the mobile computing device 102. An exemplary application loaded on the mobile computing device 102 may be an Internet browser. Another exemplary application may be an application that allows a user of the mobile computing device 102 to select an object for which instructions are desired. Other applications that can be included in the mobile computing device 102 are also contemplated. Additionally or alternatively, the mobile computing device 102 can include a data input interface that allows data to be received from an external storage device, such as a DVD, etc. Still further, the mobile computing device 102 can be pre-loaded with data/instructions that facilitate annotating images, as described in greater detail below.

Continuing with the above example, the mobile computing device 102 may include a selector component 104 that can be employed in connection with selecting an object for which instructions are desired. For instance, upon initiating the selector component 104, a plurality of selectable objects can be presented to the user on the display screen of the mobile computing device 102. For example, an object as used herein may be an appliance, a part of an automobile, an item to be assembled, or other suitable object where instructions may be desired. Using the selector component 104, a user may select one or more objects, wherein the user desires receipt of instructions pertaining to the one or more selected objects.

The mobile computing device 102 may additionally include a camera 106 that can be employed in connection with capturing an image of an object that corresponds to the object selected by way of the selector component 104. The camera 106 may be or include a variety of suitable imaging devices and/or imaging-related devices, such as a regular camera, a different modality camera, a range sensing imager (such as 3DV systems ZCam), a stereo camera, a structure light system, a radar system, a Light Detection and Ranging (LIDAR) scanner, etc. In operation, for instance, if the user selected a part of a dishwasher, the camera 106 can be used in connection with capturing an image of the part of the dishwasher. Furthermore, instructions may be presented to the user of the mobile computing device 102 with respect to an approximate orientation to employ when capturing the image through use of the camera 106. In addition, the mobile computing device 102 can include a mini projector. For example, the mini projector may be included as an integrated portion of the camera 106.

The system 100 can also include a server 108 that can receive the image captured by the camera 106. For instance, the user of the mobile computing device 102 can initiate a command that causes the captured image to be transmitted to the server 108 by way of a suitable network connection. The server 108 can include an annotator component 110 that can receive the captured image from the mobile computing device 106 and can automatically visually annotate a captured image. Specifically, the annotator component 110 can visually annotate the captured image with annotations, thereby generating an annotated image. For instance, such annotations may be instructions for performing a particular task with respect to the object in the captured image. Annotations generated by the annotator component 110 may be, for example, images that are overlaid onto the captured image (e.g., arrows, shapes, etc.). In another example, annotations generated by the annotator component 110 may be animations, video annotations, textual annotations, etc. Furthermore, the annotator component 110 can cause an audio clip to be associated with the captured image. Operation of the annotator component 110 will be described in greater detail below. Furthermore, the server 108 may include a bundler (not shown) that can allow the captured image to be compared/matched with images on the server 108 corresponding to the object in the captured image (at least one of which is annotated), and a mapping can be generated between the captured image and at least one of the images on the server 108, wherein the mapping can be used by the annotator component 110 to determine where to place annotations on the captured image. Operation of a bundler (feature extraction and mapping) is described in greater detail below).

The server 108 may also optionally include an advertiser component 112 that can generate an advertisement corresponding to contents of a captured image received at the server 108. For example, if the user of the mobile computing device 102 desires instructions for a dishwasher and accordingly selects a dishwasher and uses the camera 106 to capture an image of a dishwasher, the advertiser component 112 may generate an advertisement pertaining to dishwashers. For instance, an advertisement output by the advertiser component 112 may direct a user to a web site where certain dishwasher parts are sold. Thus, the advertisement component 112 can output an advertisement in the form of a selectable hyperlink or a linked graphical object.

The server 108 can also include a transmitter component 114 that can be used in connection with transmitting the annotated image (e.g., the image annotated by the annotator component 110) to the mobile computing device 102. The annotated image may then be displayed to the user on a display screen of the mobile computing device 102. Thus, the user of the mobile computing device 102 can be provided with instructions pertaining to an object at the viewing perspective of the user. Further, if the mobile computing device 102 includes a mini projector, annotations can be directly projected onto the object.

While the system 100 has been described above with respect to providing instructions pertaining to an object, it is to be understood that the system 100 may be used to provide various types of instructions in the form of annotations. For instance, the user of a mobile computing device 102 may be in the downtown area of a city and may wish to have aid in locating a particular business. The user may capture an image of their current location and transmit such image to the server 108. The annotator component 110 may then annotate such image to provide instructions to the user at a user's current viewing perspective. Furthermore, the annotator component 110 can receive a video clip from the mobile computing device 102 and can annotate at least a portion of the video clip.

While the server 108 is shown as comprising the annotator component 110, the bundler, the advertisement component 112 and the transmitter component 114, it is to be understood that one or more of such components may reside on the mobile computing device 102. Further, the above examples have been described with respect to the transmittal of a single image from the mobile computing device 102 to the server 108, it is to be understood that instructions may be provided over multiple images. For instance, first instructions annotated on an image received from the mobile computing device 102 may be instructions for removing a casing. Once such casing is removed the user of the mobile computing device 102 may use the camera 106 to capture a subsequent image. This subsequent image may then be transmitted to the server 108 and annotated by the annotator component 110. This process can repeat until a task being performed by the user is completed. Moreover, the annotator component 110 can cause different annotations to be presented on a single image. For instance, an image may be annotated with a first set of annotations pertaining to a first step. The same image or a copy of the image may be annotated differently to show portions of a subsequent step.

Figure 2:
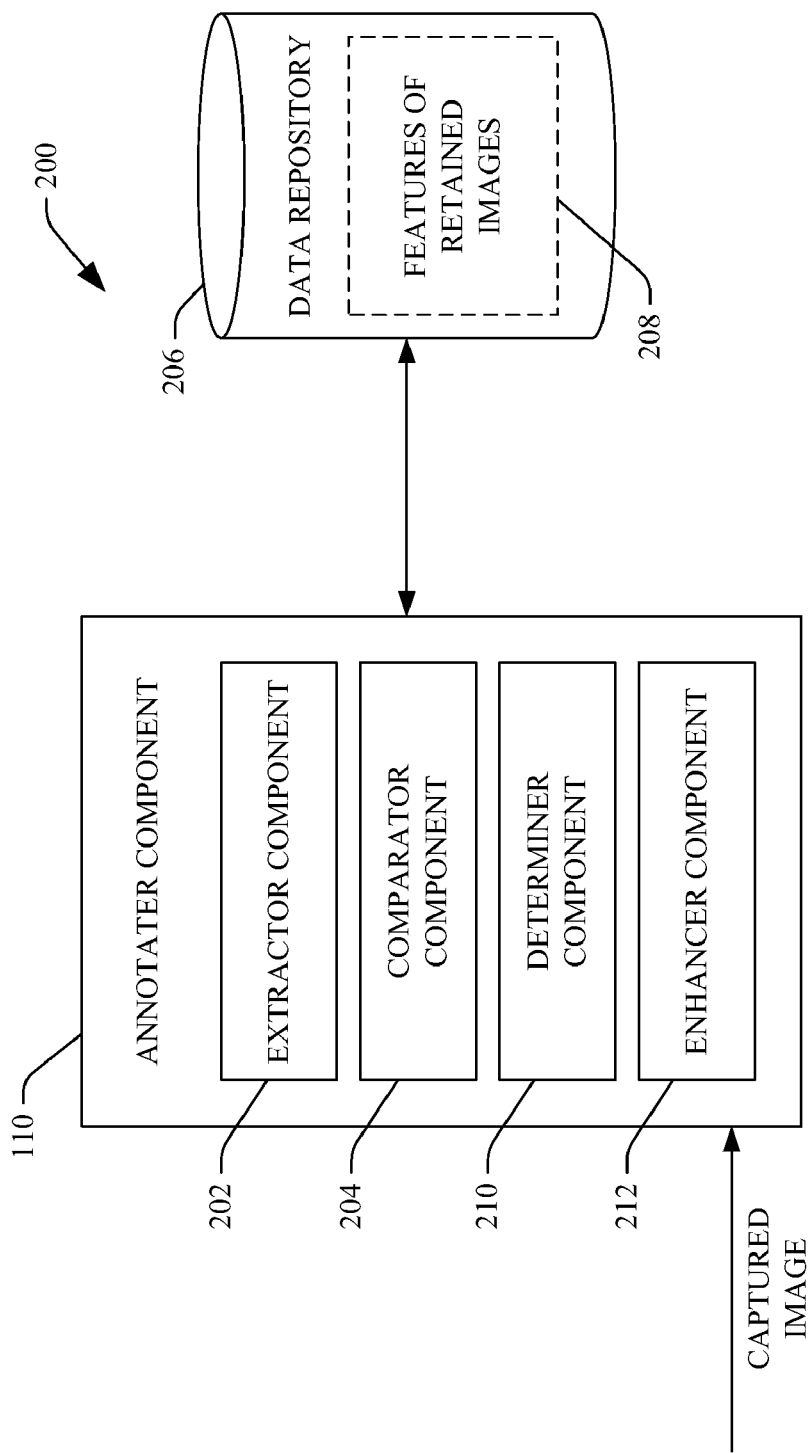
FIG. 2 is a functional block diagram of an exemplary annotator component.

With reference now to FIG. 2, an example system 200 that facilitates automatically annotating an image is illustrated. The system 200 includes the annotator component 110, which can receive an image captured through use of a mobile computing device. As shown, the annotator component 110 may include an extractor component 202 that extracts at least one feature from a captured image. For instance, the extractor component 202 can analyze the captured image and can recognize straight lines in the captured image. In another example, the extractor component 202 can analyze the captured image and can recognize certain colors existent in the captured image and location in the image thereof. In still yet another example, the extractor component 202 can analyze the captured image and extract certain shapes and can determine location of such shapes in the captured image. Other example features may include Scale Invariant Feature Transform (SIFT) interest points, Maximally Stable Extremal Regions (MSERs), corners, etc. Further, manufacturers may place marks on appliances that can be used for matching, and such marks can be features that are extracted by the extractor component 202. For instance, features extracted by the extractor component 202 may provide an indication of an orientation of an object existent in the captured image.

The annotator component 110 may further include a comparator component 204 that can compare the at least one feature of the captured image extracted by the extractor component 202 with at least one feature of a retained image, wherein the retained image includes an object corresponding to the object in the captured image. For instance, the comparator component 204 may be or include an image bundling application (e.g., a bundler).

The system 200 may also include a data repository 206 that comprises features of one or more retained images 208. The retained images may be images of an object corresponding to the object in the captured image. At least one feature of at least one of the images retained in the data repository 206 can correspond to the at least one feature extracted by the extractor component 202 from the captured image. Thus, for instance, the comparator component 204 can ascertain a relative position of the object in the captured image versus a corresponding object in an image in the data repository 206.

The annotator component 110 may also include a determiner component 210 that can determine a position on the captured image where annotations are desirably located. Pursuant to an example, the comparator component 204 can determine that one particular image in the data repository 206 closely corresponds with the captured image by way of comparing features extracted from a captured image with features of the retained images in a data repository 206. Once such determination is made, the determiner component 210 can determine a location where annotations are desirably located on the captured image. The annotator component 110 may then annotate the captured image at the location determined by the determiner component 210.

The annotator component 110 may further include an enhancer component 212 that causes a captured image and/or features extracted therefrom to be retained in the data repository 206. Thus, the enhancer component 212 may be used in connection with causing the annotator component 110 to be more robust in connection with automatically annotating images as additional images of objects and/or features corresponding thereto can be used in connection with determining where to place annotations on received images.

Figure 3:
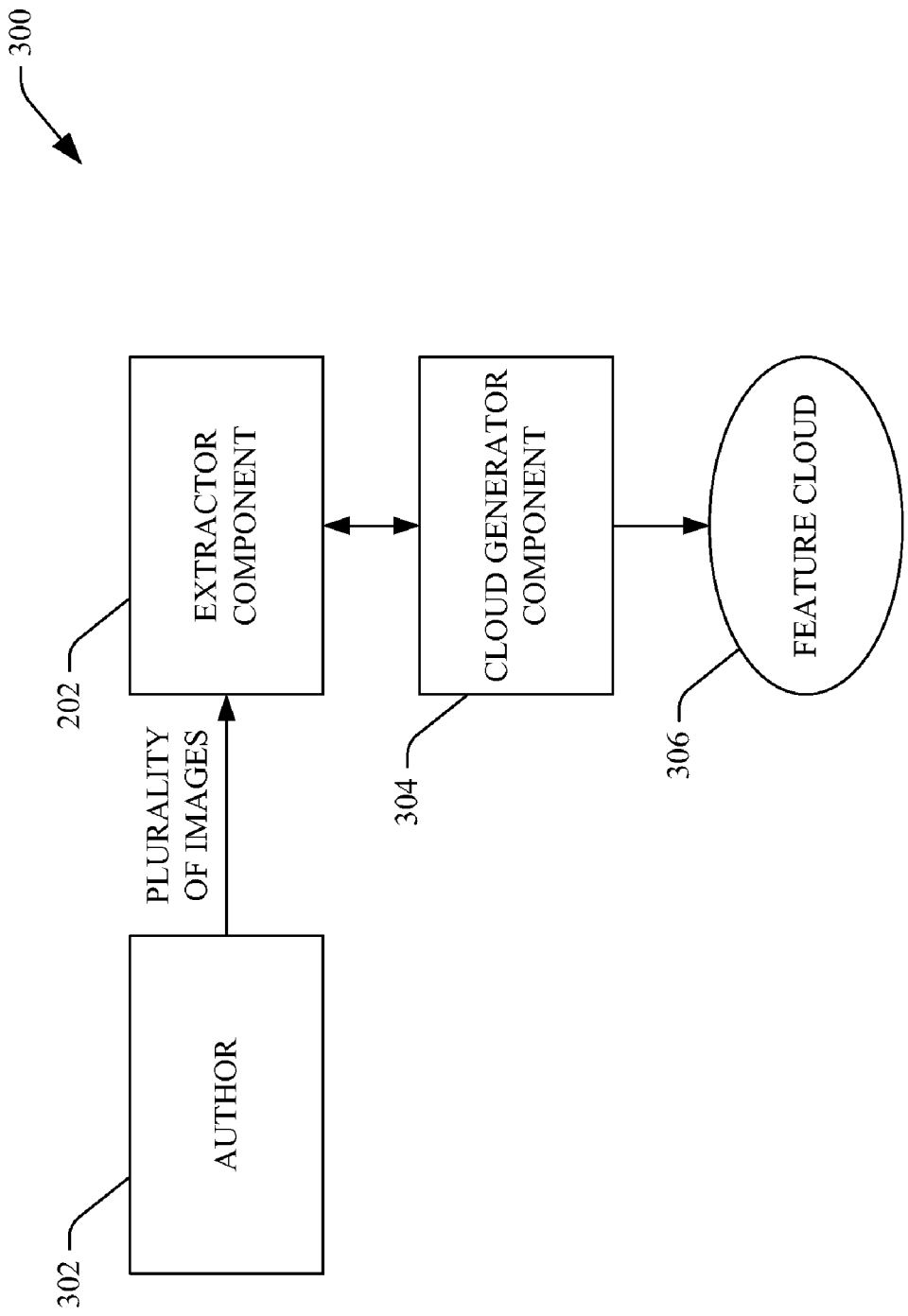
FIG. 3 is a functional block diagram of an exemplary system that facilitates automatically annotating images.

Now referring to FIG. 3, an example system 300 that facilitates automatic annotation of images is illustrated. The system 300 includes the extractor component 202, wherein the extractor component 202 is configured to receive a plurality of images from an author 302. The author 302 can be an individual that originally provides instructions with respect to an object and/or location. For instance, the author 302 may have knowledge pertaining to fixing a dishwasher and thus may provide instructions pertaining to fixing the dishwasher. The instructions provided by the author 302 to the extractor component 202 may be in the form of a plurality of images, wherein at least one of such images is associated with annotations. In an example, the author 302 can perform an operation step by step and, for each step, capture several images (e.g., because another user may not take pictures from an exact point of view). Thus, the author 302 can attempt to cover a variety of view angles. Again, for at least one of the images per step, the author can provide annotations.

The extractor component 202 can, upon receipt of each of the plurality of images provided by the author 302, extract one or more features from the images. The system 300 also includes a cloud generator component 304 that can receive the features from the extractor component 202 and can generate a feature cloud 306 based at least in part upon the extracted features. The extractor component 202 and the cloud generator component 304 can, in conjunction, determine relative position between images provided by the author 302 for each step based at least in part upon the features extracted by the extractor component 202. Additionally or alternatively images provided by the author 302 may include data pertaining to location of a camera for each image. For instance, a camera used by the author 302 may be equipped with GPS functionality, a gyroscope or other suitable orientation sensor, etc. With respect to the feature cloud 306, such feature cloud 306 can be a cloud of points (features) that were matched between images and used to calculate a position of an object in an image relative to position of the object in another image. Thus, the feature cloud 306 can be at least a rough representation of where in space an object lies in the images provided by the author 302.

Additionally or alternatively, the author may place easily recognizable marker(s) around to object to facilitate matching and bundling. Furthermore, the author may generate a three-dimensional model of a particular object (in addition to or alternatively to a cloud of points). The author may use stereo scanning, 3D scanning, structure light, a computer-aided drafting (CAD) application, etc. in connection with generating a three-dimensional model of the object.

Accordingly, when a user wishes to receive instructions in the form of annotations upon an image, the user can capture an image of an object for which instructions are desired. The extractor component 202 can extract at least one feature from the image provided by the user and such feature can be employed in connection with determining a relative position of the object with respect to at least one of the images provided by the author 302. Based upon such position determination, annotations placed on at least one of the images provided by the author 302 for a particular step can be positioned onto the image provided by the user.

Figure 4:
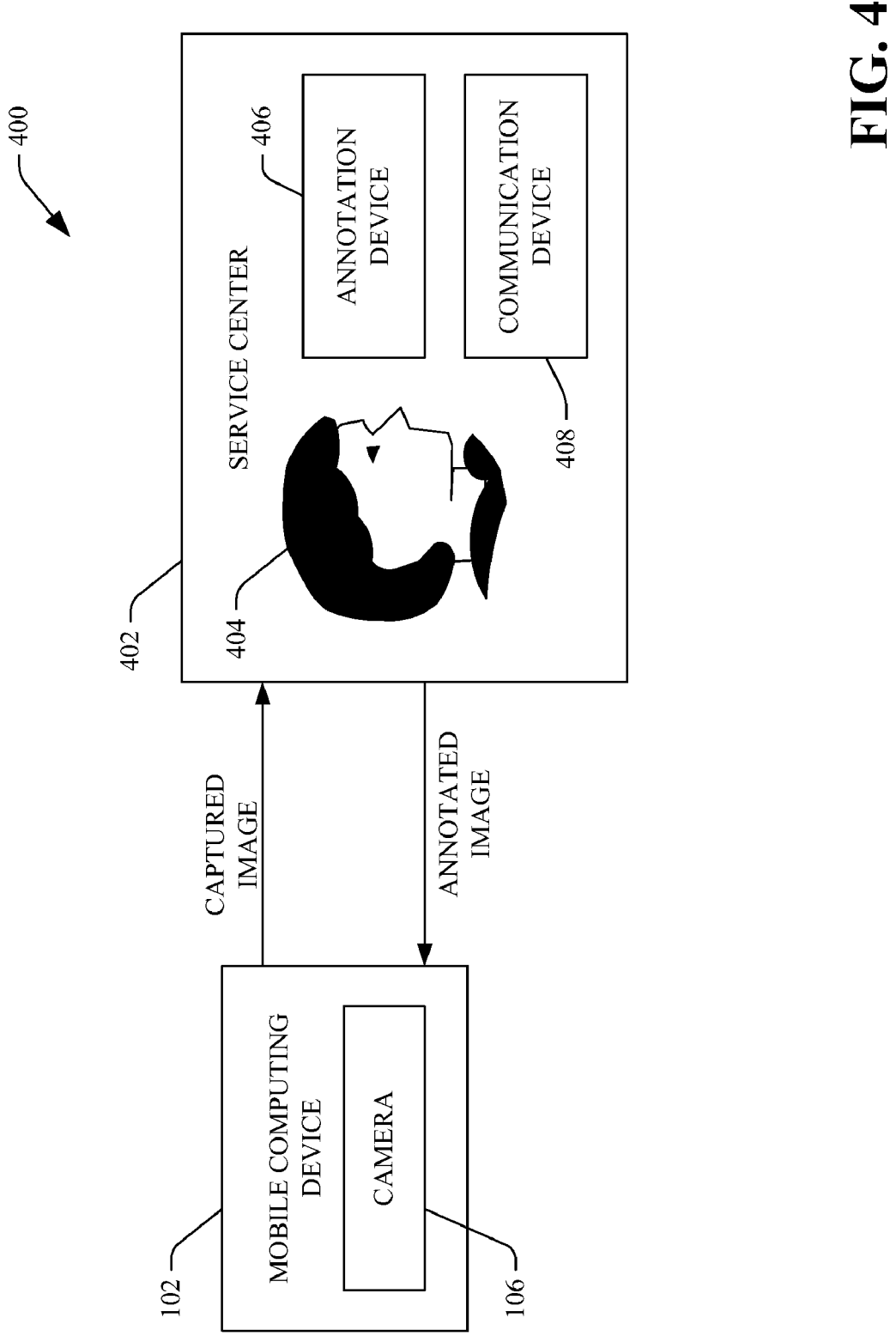
FIG. 4 is a functional block diagram of an exemplary system that facilitates using a service representative to annotate images.

Now referring to FIG. 4, an exemplary system 400 that facilitates providing instructions in the form of annotated images is illustrated. While the previous exemplary systems have described the automatic annotation of images, annotation of images provided by a service representative in real time is also contemplated. A system 400 includes the mobile computing device 102 which comprises the camera 106. In this example, the mobile computing device 102 may also be a communications device such as a portable telephone. Additionally, the mobile computing device 102 can include a display screen, wherein images/instructions can be depicted on the display screen.

The system 400 may also include a service center 402 that employs at least one service representative 404. For instance, the service center 402 and the service representative 404 may service particular appliances. The service center 402 may include an annotation device 406 which can be used by the service representative 404 to annotate an image in real-time. The service center 402 can additionally include a communication device 408 that allows the service representative 404 to communicate with a user of the mobile computing device 102.

In operation, the user of the mobile computing device 102 may wish to receive instructions with respect to an object. The user of the mobile computing device 102 may contact the service center 402 and be placed in communication with the service representative 404. The user of the mobile computing device 102 may inform the service representative 404 that instructions are desired for a particular object. Thereafter, the service representative 404 may request that the user of the mobile computing device 102 capture an image of the object through use of the camera 106 and transmit the image to the service representative 404 (e.g., to a computer used by the service representative 404).

Upon receipt of the image of the object, the service representative 404 can use the annotation device 406 to annotate the captured image with instructions in real-time. Additionally, the service representative 404 can provide verbal instructions to the user of the mobile computing device 102. As noted above, the annotations may be image data overlaid onto a captured image, animation, etc. Once the service representative 404 has annotated the image provided by the user of the mobile computing device 102, the service representative 404 can use the communication device 408 to transmit the annotated image to the mobile computing device 102. Thus, the user can receive step-by-step instructions for completing a task with respect to an object by way of annotated images of the object.

With reference now to FIGS. 5-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 5:
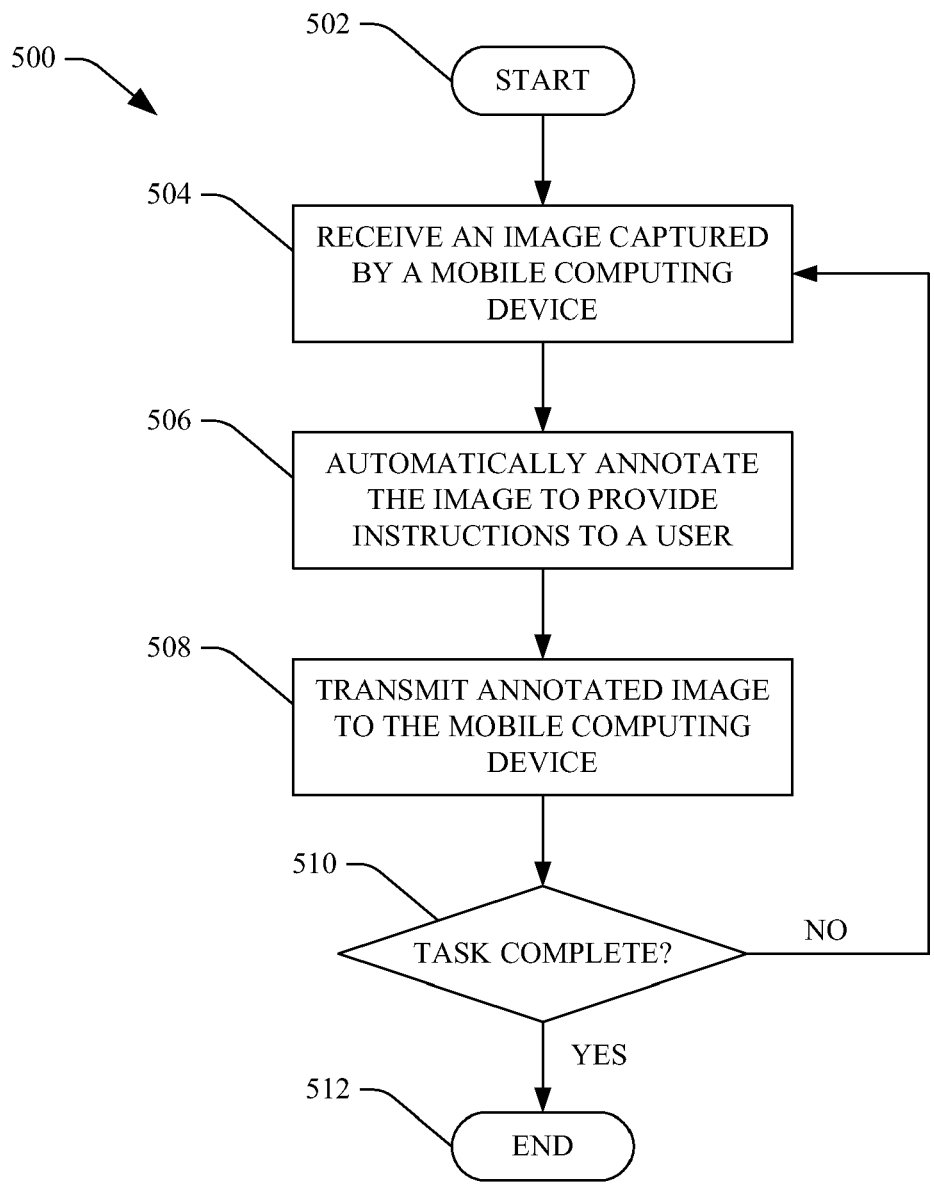
FIG. 5 is a flow diagram that illustrates an exemplary methodology for automatically annotating an image provided by a mobile computing device.

Referring now to FIG. 5, an exemplary methodology 500 that facilitates automatically annotating images is illustrated. The methodology 500 begins at 502, and at 504 an image captured by a mobile computing device is received. For instance, the mobile computing device may be a portable telephone, a personal digital assistant, or other suitable device that includes a digital camera. The received image can be received from a user who wishes to receive instructions pertaining to an object included in the image received at 504. In another example, the image may be a portion (e.g., a frame) of a video clip captured by the user.

At 506, the image received at 504 is automatically annotated to provide instructions to the user. For instance, the received image can be annotated with one or more annotations thereby creating an annotated image. In an example, the annotations may include images overlaid on the image received at 504. In another example, the annotations may include animation overlaid on the image received at 504.

As noted above, automatically annotating the image may include comparing the image received at 504 with at least one retained image, wherein the retained image includes the annotations that are placed on the image received at 504. Thereafter, the annotations on the retained image can be positioned on the image received at 504 based at least in part upon the comparison. As noted above, the retained image may be one of a plurality of images of an object that corresponds to the object captured in the image received at 504, wherein the plurality of images corresponds to a particular step of a task. Furthermore, location (e.g., viewing perspective), orientation, etc. of the images in the plurality of retained images may be known with respect to one another.

At 508, the annotated image can be transmitted to the mobile computing device. At 510, a determination is made regarding whether a task pertaining to the instructions is complete. For instance, the annotations on the received image may be instructions for one step in a task. If the task is not complete, the methodology can return to act 504. If at 510 it is determined that the task is complete, the methodology 500 completes at 512.

Figure 6:
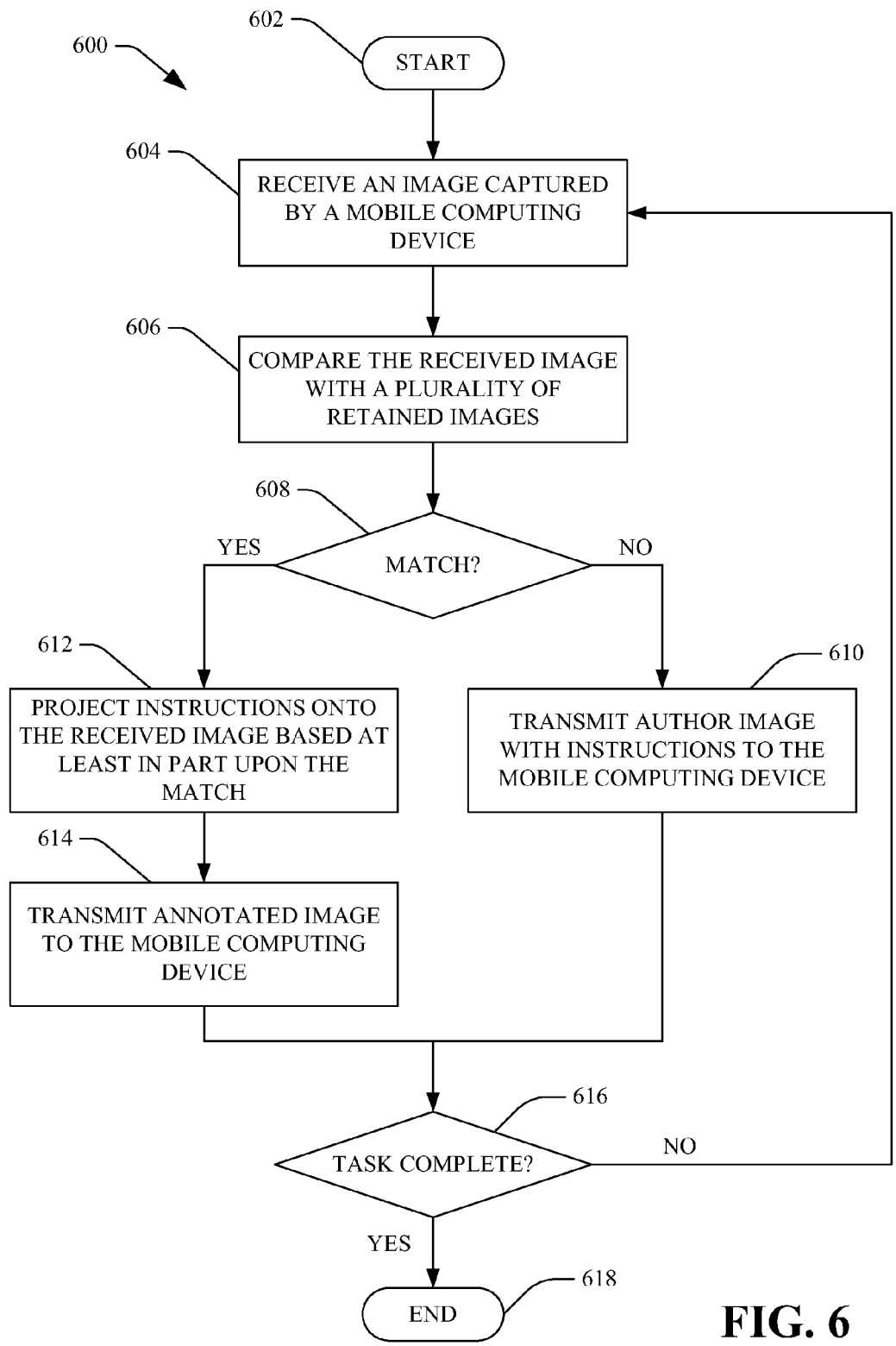
FIG. 6 is a flow diagram that illustrates an exemplary methodology for providing a user with annotated instructions.

With reference now to FIG. 6, an exemplary methodology 600 that facilitates providing a user with instructions is illustrated. For instance, the methodology 800 may be executed on a server. In another example, the methodology 600 may be executed at least in part on a client computing device. The methodology 600 starts at 602, and at 604 an image captured by a mobile computing device is received. The image may include an object for which instructions are desired. In another example, the image may pertain to current location of a user, wherein the user wishes to receive some form of travel directions.

At 606, the received image is compared with a plurality of retained images. For instance, the comparison may be undertaken to ascertain whether one or more features in the received image are similar to one or more features of the retained images (e.g., if an object in the received image corresponds to an object in one of the plurality of retained images).

At decision block 608, a determination is made regarding whether a match exists between the received images and at least one of the retained images.

If no match exists, then at 610 an author image is transmitted to the mobile computing device, wherein the author image comprises instructions pertaining to the object existent in the received image. For instance, as noted above, an author image may be an image provided by an individual who additionally provides instructions pertaining to an object in the image. Thus, if the image provided by the user cannot be correlated with an image provided by the author, an image provided by the author which includes instructions pertaining to the object may be transmitted to the mobile computing device.

If at 608 it is determined that a sufficient match exists, then at 612 instructions are automatically projected onto the received image based at least in part upon the match. For instance, the instructions may be in the form of visual annotations that are placed onto the received image, wherein placement of such annotations may be based upon a determined position/orientation of an object and the received image determined when performing the comparison at 606.

At 614, the annotated image is transmitted to the mobile computing device. At 616, a determination is made regarding whether a task is complete. For example, the annotations placed on the image at 612 may include instructions for a single step in a multi-step task. If the task is not complete, the methodology returns to 604 where another image of the object is received from the mobile computing device. If the task is complete, the methodology completes at 618.

Figure 7:
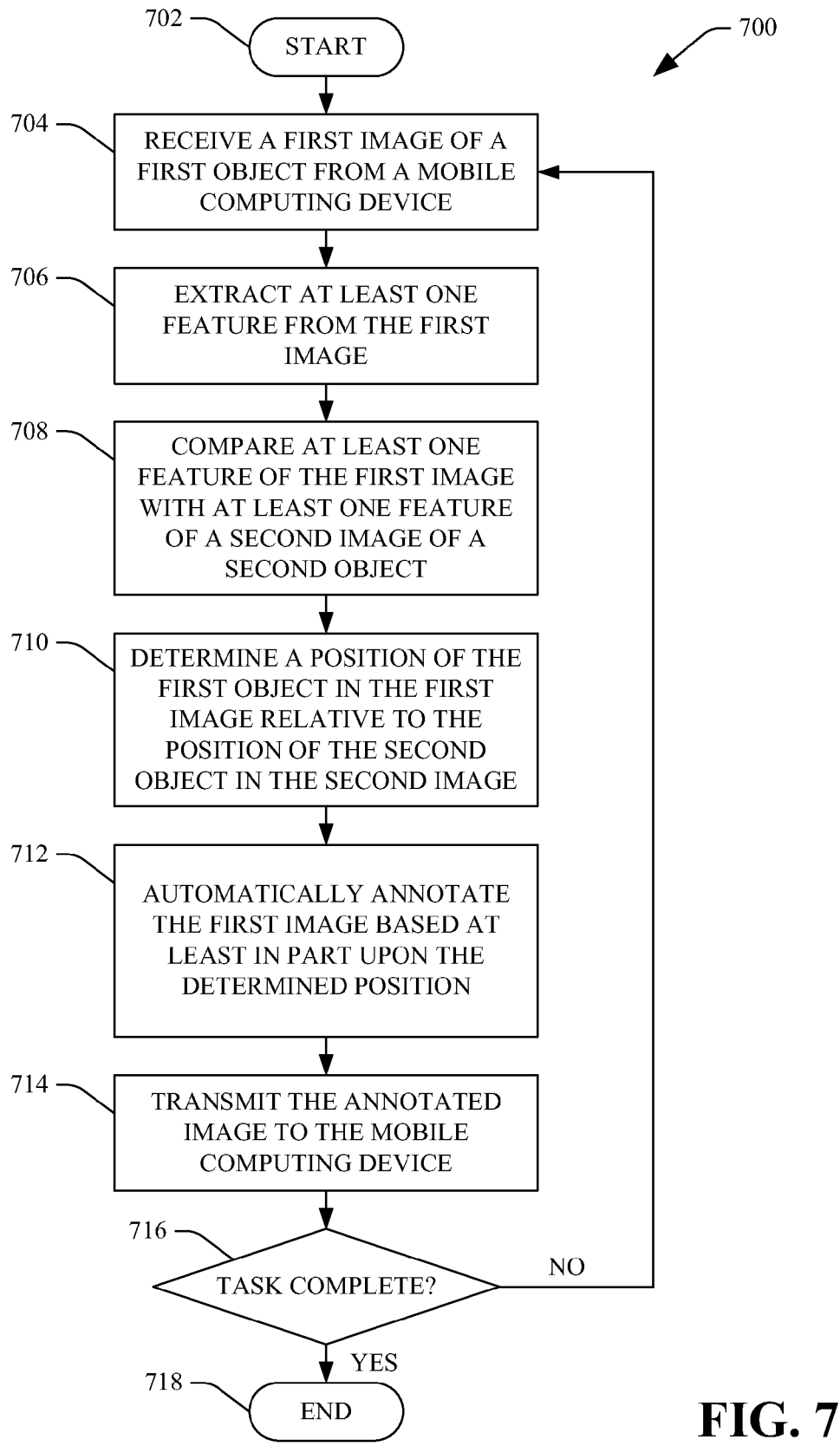
FIG. 7 is a flow diagram that illustrates an exemplary methodology for automatically annotating an image.

Now referring to FIG. 7, an exemplary methodology 700 for automatically annotating an image is illustrated. For instance, at least a portion of the methodology 700 may be executed at a server. In another example, at least a portion of the methodology 700 may be executed at a client device such as a mobile computing device.

The methodology 700 starts at 702, and at 704 a first image of a first object is received from a mobile computing device. At 706 at least one feature is extracted from the first image. For instance, the extracted feature may be used in connection with determining a size and/or orientation of the object with respect to the point of view of the camera. In some implementations, the extracted feature may be used in connection with identifying the object in the captured image.

At 708, at least the one feature of the first image is compared with at least one feature of a second image of a second object, wherein the second object corresponds to the first object. For example, the first image may include a dishwasher and the second image may include another dishwasher that is a substantially similar model when compared to the dishwasher in the first image.

At 710, a position of the first object in the first image is determined relative to the position of the second object in the second image. As described above, a feature cloud may be used in connection with determining relative position of the first object in the first image with respect to the second object in the second image.

At 712, the first image is automatically annotated based at least in part upon the determined position of the first object in the first image. In an example, the second image may include annotations with respect to the second object in the second image. As a position/orientation of the first object in the first image can be determined relative to the position/orientation of the second object in the second image, annotations can be translated from the second image to the first image.

At 714, the annotated first image is transmitted to the mobile computing device. For example, the annotated image can be transmitted such that it is displayed on a display screen of the mobile computing device.

As noted above, the annotations on the image may pertain to a particular step in a multi-step task. Accordingly, at 716 a determination can be made regarding whether the task is completed. If the task is not completed then the methodology can return to act 704, where a subsequent image is received from the mobile computing device. If the task is determined to be completed, then the methodology 700 completes at 718.

Figure 8:
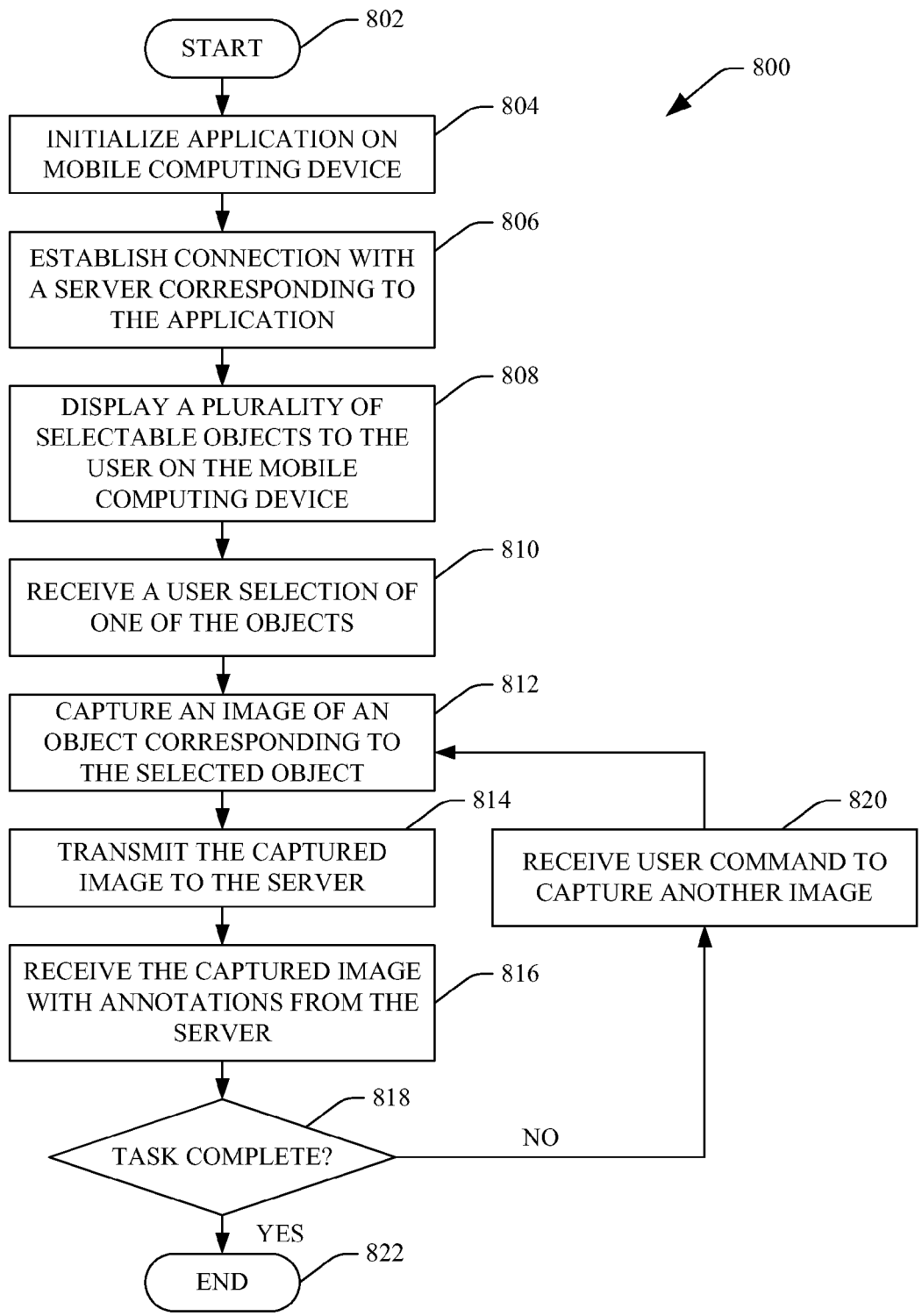
FIG. 8 is a flow diagram that illustrates an exemplary methodology for providing a plurality of annotated images to a mobile computing device.

Now turning to FIG. 8, an example methodology 800 for receiving instructions for performing a task at a mobile computing device is illustrated. For instance, a mobile computing device may be configured to execute the methodology 800.

The methodology 800 starts at 802, and at 804 an instruction application is initialized on the mobile computing device. Pursuant to an example, the user may have knowledge that the application allows the user to receive instructions with respect to a particular object and/or travel directions with respect to a particular location.

At 806, a connection is established with a server that corresponds to the initialized application, wherein establishing a connection may comprise performing some sort of handshaking between the mobile computing device and the server. In another example, establishing the connection may comprise validating user credentials such as a user ID or a password, validating a license corresponding to the application, etc.

At 808, a plurality of selectable objects and/or locations can be displayed to the user on the mobile computing device. For instance, if the initialized application includes options pertaining to maintaining or fixing an automobile, the selectable objects may be particular portions of such automobile. In another example, the application may include options pertaining to receiving directions for appliances, options pertaining to various different types of appliances, etc.

At 810, a user selection of one of the plurality of selectable objects is received. For example, if the user wishes to receive instructions for fixing a particular model of refrigerator, the user can select an object that is representative of such model of refrigerator. The application may then provide the user with instructions that request that the user capture an image corresponding to the selected object.

At 812, an image of an object corresponding to the selected object can be captured. Thus, it can be ascertained that the mobile computing device may include a digital camera. At 814, the captured image is transmitted to the server that corresponds to the application. The server may then annotate the image as described above.

At 816, the captured image can be received from the server, where the captured image has been annotated with annotations. As described above, the annotations may be instructions for completing a step of a task. In another example, a plurality of copies of the captured image can be received, wherein each of the copies is annotated differently with respect to different steps in a task. For instance, a first copy of the image may have a first set of annotations (e.g., removing a series of screws). The mobile computing device may also receive a second copy of the captured image that includes different annotations (e.g., removing a casing). Furthermore, a single copy of the captured image can be received at the mobile computing device and several different annotations for such captured image may be received at the mobile computing device. Thus, for instance, upon depression of a button or receipt of some other user command, the mobile computing device can cause different annotations to be placed on the captured image.

Still further, hierarchical instructions can be presented to the user at the mobile computing device in the form of one or more annotated images. For instance, a first copy of an annotated image may include instructions at a high level for performing a particular task or step of a task. If the user wishes to receive more detailed instructions, an option can be presented to the user wherein selection of the option causes more detailed annotations to be displayed on the mobile computing device (e.g., more granular instructions for performing the step of the task).

Still further, advertisements, comments from other users, etc. may be received at the mobile computing device from the server. For instance, other users may find a particular step to be difficult and thus may provide comments pertaining to completion of the step. These comments may be transmitted from the server to the mobile computing device in an effort to aid the user in completing the step. For example, the user may filter comments to those in a social network of the user. In another example, the user may filter comments to those with particular ratings or expertise levels. Still further, one or more advertisements can be provided to the mobile computing device pertaining to a particular step or a particular object that corresponds to the captured image.

At 818, a determination is made regarding whether all steps in the task have been completed. If the task is not complete, then at 820 a user command is received to capture another image. In an example, this command may be depression of a button that causes the camera to capture another image. In another example, the command may be a voice command. In still yet another example, the user may need both hands to perform a step and thus the command received from the user may be an audible command, a waving of an arm, or some other suitable command. Thereafter, the methodology returns to act 812 where another image is captured. If it is determined at 818 that the task has been completed, then the methodology 800 completes at 820.

Figure 9:
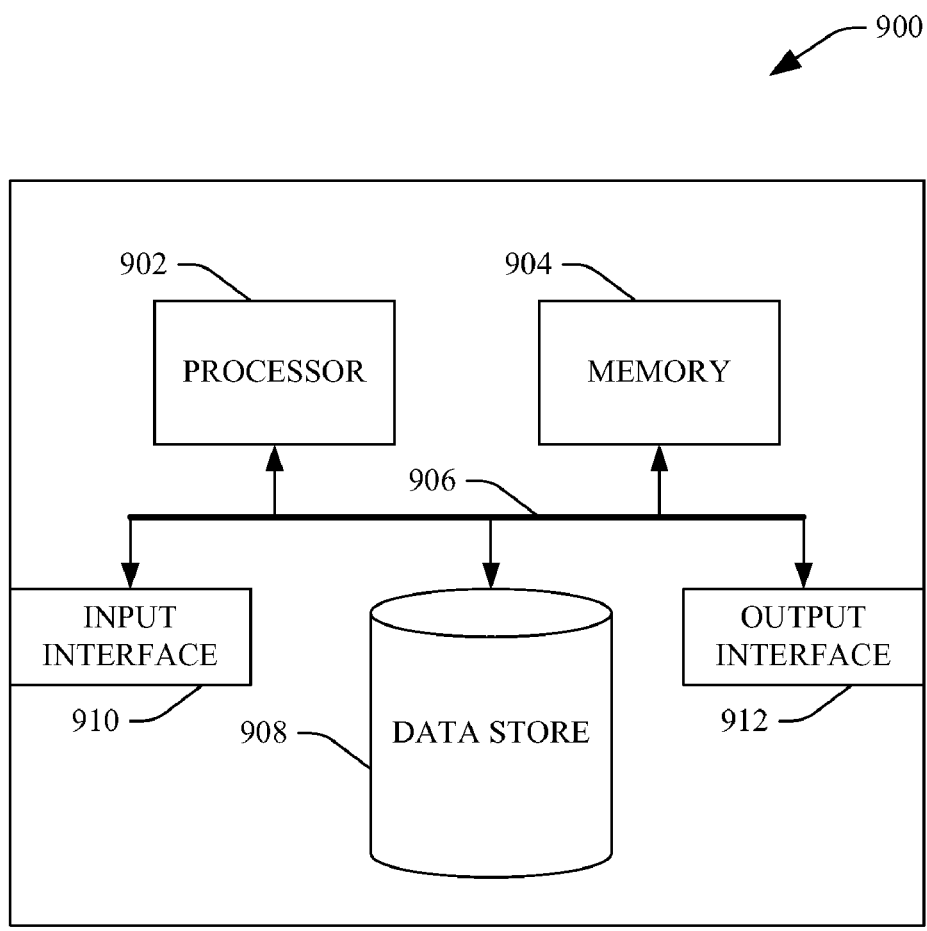
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports automatic annotation of images. In another example, at least a portion of the computing device 900 may be used in a system that supports real time annotation of images by a service representative. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store annotations, a feature cloud, etc.

The computing device 900 additionally includes a data store 908 that is accessible by the processor 902 by way of the system bus 906. The data store 908 may include executable instructions, annotations, a plurality of images, a feature cloud, etc. The computing device 900 also includes an input interface 910 that allows external devices to communicate with the computing device 900. For instance, the input interface 910 may be used to receive instructions from an external computer device, such as a mobile telephone, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computer processor, the method comprising:
    receiving a first image of a first object from a computing device of a first user, the first image having first annotations thereon relative to a first location of the first object, the first annotations generated by the first user, the first annotations being instructions for performing a first step in a task;
    receiving a second image of the first object from the computing device of the first user, the second image having second annotations thereon relative to a second location of the first object, the second annotations generated by the first user, the second annotations being instructions for performing a second step in the task;
    receiving an indication from a second user that the second user desires to complete the task;
    subsequent to receiving the first image, the second image, and the indication, receiving a first image of a second object captured by a mobile computing device of the second user by way of a network, the second object corresponding to but being different than the first object in the first image;
    responsive to receipt of the first image of the second object, accessing the first image of the first object;
    transferring the first annotations from the first image of the first object to the first image of the second object to create a first annotated image of the second object, the first annotations positioned relative to the second object in the first image of the second object at a third location that corresponds to the first location relative to the first object in the first image of the first object;

transmitting the first annotated image of the second object to the mobile computing device of the second user by way of the network;

receiving an indication from the second user that the first step in the task has been completed but the task is incomplete;

receiving a second image of the second object from the mobile computing device by way of the network subsequent to receiving the indication from the user that the first step in the task has been completed but the task is incomplete;

transferring the second annotations from the second image of the first object to the second image of the second object to create a second annotated image of the second object, the second annotations positioned relative to the second object in the second image of the second object at a fourth location that corresponds to the second location relative to the first object in the first image; and transmitting the second annotated image of the second object to the mobile computing device by way of the network.

2. The method of claim 1, wherein at least one of the first annotations or the second annotations comprise at least one of animation overlaid on the first image of the second object or the second image of the second object received from the mobile computing device or images overlaid on the first image of the second object or the second image of the second object from the mobile computing device.

3. The method of claim 1, further comprising transmitting at least one advertisement to the mobile computing device that pertains to at least one of the first annotations or the second annotations.

4. The method of claim 3, wherein the at least one advertisement is in the form of a selectable hyperlink.

5. The method of claim 1, wherein the mobile computing device is a portable telephone that comprises a digital camera.

6. The method of claim 1, further comprising:

retaining the first annotated image of the second object; and using the first annotated image of the second object in connection with annotating a subsequently received image from a second mobile computing device.

7. The method of claim 1, further comprising transmitting audio instructions to the mobile computing device that correspond to at least one of the first annotations or the second annotations.

8. The method of claim 1, wherein the second image of the second object is a portion of a video stream received from the mobile computing device.

9. The method of claim 1, further comprising transmitting comments of other users corresponding to at least one of the first annotations or the second annotations to the mobile computing device by way of the network.

10. A system comprising:

a processor; and a memory that comprises a plurality of components that are executable by the processor, the components comprising:

an annotator component that receives a first image of a first object from a mobile computing device of a first user by way of a network, wherein the first image of the first object corresponds to a multi-step task desirably undertaken with respect to the first object by the first user, wherein responsive to receiving the first image, the annotator component:

accesses a first image of a second object from a data repository, the first image of the second object previously received from a computing device of a second user, the first image of the second object comprising first annotations generated by the second user and positioned in the first image of the second object at a first location relative to the second object, the second object corresponding to but different than the first object, the first annotations corresponding to a first step of the multi-step task; and automatically visually annotates the first image of the first object with the first annotations to generate a first annotated image of the first object, the annotator component transferring the first annotations from the first image of the second object to the first image of the first object to visually annotate the first image of the first object, the annotator component positioning the first annotations at a second location in the first image of the first object relative to the first object that corresponds to the first location in the first image of the second object; and a transmitter component that transmits the first annotated image to the mobile computing device of the first user by way of the network, wherein subsequent to the transmitter component transmitting the first annotated image to the mobile computing device of the user, the annotator component receives an indication from the first user that the first step is complete but the multi-step task is incomplete, and wherein the annotator component receives a second image of the first object from the first user and transfers second annotations from a second image of the second object to the second image of the first object to generate a second annotated image, the second annotations corresponding to a second step of the multi-step task, and wherein subsequent to the annotator component generating the second annotated image, the transmitter component transmits the second annotated image to the mobile computing device of the first user by way of the network.

11. The system of claim 10, wherein at least one of the first annotations or the second annotations comprise image data.

12. The system of claim 10, wherein the plurality of components further comprises an advertisement component that provides an advertisement to the mobile computing device that pertains to the first object.

13. The system of claim 10, wherein the plurality of components further comprises:

a comparator component that compares the first image of the first object with a plurality of other retained images and determines an orientation of the first object in the first image of the first object with respect to one or more corresponding but different objects in the plurality of other retained images; and a determiner component that determines the second location of the first object based at least in part upon the orientation of the first object in the first image of the first object relative to orientations of the corresponding but non-identical objects in the plurality of other retained images.

14. The system of claim 10, wherein the first annotations and the second annotations pertain to repairing the first object in the first image.

15. The system of claim 10 comprised by a server that is accessible to the mobile computing device by way of a browser.

16. The system of claim 10, wherein the plurality of components further comprises:
  an extractor component that extracts a feature from the first image of the first object responsive to receiving the first image of the first object; and
  a comparator component that compares the feature extracted from the first image of the first object with at least one feature in the first image of the second object to determine an orientation of the first object in the first image of the first object relative to the second object in the first image of the second object, wherein the annotator component positions the first annotations in the first image of the first object at the second location based upon the orientation of the first object in the first image of the first object relative to the second object in the first image of the second object.

17. A computer-readable storage device comprising instructions that, when executed by a processor, cause the processor to perform acts comprising:
  receiving, by way of a first network connection, a first image of a first object from a computing device of a first user, the first image of the first object comprising first annotations at a first location relative to the first object in the first image of the first object, the first annotations applied to the first image of the first object at the first location by the first user prior to receiving the first image of the first object, the first annotations being first instructions for completing a first step of a multi-step task;
  receiving, by way of the first network connection, a second image of the first object from the computing device of the first user, the second image of the first object comprising second annotations at a second location relative to the first object in the second image of the first object, the second annotations applied to the second image of the first object at the second location prior to receiving the second image, the second annotations being second instructions for completing a second step of the multi-step task;
  receiving a first image of a second object from a mobile computing device of a second user by way of a second network connection, the second object corresponding to but different from the first object;
  receiving input from the mobile computing device that the second object in the first image of the second object corresponds to the first object;
  responsive to receiving the input from the mobile computing device, extracting at least one feature from the first image of the second object;
  comparing the at least one feature extracted from the first image of the second object with a corresponding feature in the first image of the first object;
  determining orientation of the second object in the first image of the second object relative to the first object in the first image of the first object based upon the comparing of the at least one feature extracted from the first image of the second object with the corresponding feature in the first image of the first object;
  determining a second location in the first image of the second object that corresponds to the first location in the first image of the first object based at least in part upon the determining of the orientation of the second object in the first image of the second object relative to the first object in the first image of the first object;
  automatically transferring the first annotations from the first location in the first image of the first object to the second location in the first image of the second object responsive to determining the second location in the first image of the second object to create a first annotated image;
  transmitting the first annotated image to the mobile computing device by way of the second network connection;
  receiving a second image of the second object from the mobile computing device of the second user, wherein receiving the second image of the second object indicates that the first step in the multi-step task is complete but the task is incomplete;
  transferring the second annotations from the second image of the first object to the second image of the second object subsequent to receiving the second image of the second object to generate a second annotated image; and
  transmitting the second annotated image to the mobile computing device.

18. The computer-readable storage device of claim 17, wherein the first annotations and the second annotations pertain to repairing the first object and the second object.

19. The computer-readable data storage device of claim 17 comprised by a web server.

20. The computer-readable data storage device of claim 17, wherein the mobile computing device is a mobile telephone that comprises a digital camera.

* * * * *